US008893285B2

(12) United States Patent
Zucker et al.

(10) Patent No.: US 8,893,285 B2
(45) Date of Patent: Nov. 18, 2014

(54) SECURING DATA USING INTEGRATED HOST-BASED DATA LOSS AGENT WITH ENCRYPTION DETECTION

(75) Inventors: Elad Zucker, Netanya (IL); Eran Werner, Raanana (IL); Mattias Weidhagen, Stockholm (SE)

(73) Assignee: McAfee, Inc., Santa Clara, CA (US)

( * ) Notice: Subject to any disclaimer, the term of this patent is extended or adjusted under 35 U.S.C. 154(b) by 975 days.

(21) Appl. No.: 12/076,163

(22) Filed: Mar. 14, 2008

(65) Prior Publication Data

US 2009/0232300 A1 Sep. 17, 2009

(51) Int. Cl.
| | |
|---|---|
| *H04K 1/00* | (2006.01) |
| *G06F 21/00* | (2013.01) |
| *G06F 21/62* | (2013.01) |
| *G06F 21/78* | (2013.01) |

(52) U.S. Cl.
CPC ............ *G06F 21/6209* (2013.01); *G06F 21/78* (2013.01)
USPC ................. 726/26; 726/1; 713/182; 713/189; 713/193

(58) Field of Classification Search
USPC .......... 380/2, 225; 726/2, 26, 27, 34, 1, 9, 22, 726/31, 29–30; 713/165, 189, 193, 161, 713/182
See application file for complete search history.

(56) References Cited

U.S. PATENT DOCUMENTS

| | | | |
|---|---|---|---|
| 5,280,527 A | 1/1994 | Gullman et al. | |
| 5,572,694 A | 11/1996 | Uchino | |
| 5,796,948 A | 8/1998 | Cohen | |
| 5,845,068 A | 12/1998 | Winiger | |
| 5,941,915 A | 8/1999 | Federle et al. | |
| 5,987,610 A | 11/1999 | Franczek et al. | |
| 6,073,142 A | 6/2000 | Geiger et al. | |
| 6,367,019 B1 | 4/2002 | Ansell et al. | |
| 6,460,050 B1 | 10/2002 | Pace et al. | |
| 6,658,566 B1 | 12/2003 | Hazard | |
| 6,718,367 B1 | 4/2004 | Ayyadurai | |
| 6,741,851 B1 * | 5/2004 | Lee et al. ...................... | 455/410 |
| 6,820,204 B1 | 11/2004 | Desai et al. | |
| 6,934,857 B1 | 8/2005 | Bartleson et al. | |

(Continued)

FOREIGN PATENT DOCUMENTS

| | | |
|---|---|---|
| GB | 2411330 | 8/2005 |
| WO | WO 02093410 | 11/2002 |
| WO | WO 2006/076536 | 7/2006 |

OTHER PUBLICATIONS

Robin Layland, Data Leak Prevention: Coming Soon to a Business Near You, pp. 44-49, Business Communications Review, May 2007.*

(Continued)

*Primary Examiner* — David Garcia Cervetti
*Assistant Examiner* — Shanto M Abedin
(74) *Attorney, Agent, or Firm* — Patent Capitol Group (57) ABSTRACT

A method and system for securing data in a computer system provides the capability to secure information even when it leaves the boundaries of the organization using a data loss agent integrated with encryption software. A method for securing data in a computer system comprises detecting attempted connection or access to a data destination to which sensitive data may be written, determining an encryption status of the data destination, allowing the connection or access to the data destination when the data destination is encrypted, and taking action to secure the sensitive data when the data destination is not encrypted.

17 Claims, 5 Drawing Sheets

(56) References Cited

U.S. PATENT DOCUMENTS

| | | | |
|---|---|---|---|
| 6,957,330 B1 | 10/2005 | Hughes | |
| 6,961,765 B2 | 11/2005 | Terry | |
| 7,023,816 B2 | 4/2006 | Couillard | |
| 7,100,123 B1 | 8/2006 | Todd et al. | |
| 7,124,197 B2 | 10/2006 | Ocepek et al. | |
| 7,149,778 B1 | 12/2006 | Patel et al. | |
| 7,194,623 B1 | 3/2007 | Proudler et al. | |
| 7,257,707 B2 | 8/2007 | England et al. | |
| 7,278,016 B1 | 10/2007 | Detrick et al. | |
| 7,313,615 B2 | 12/2007 | Fitzpatrick et al. | |
| 7,346,778 B1 | 3/2008 | Guiter et al. | |
| 7,350,074 B2 | 3/2008 | Gupta et al. | |
| 7,350,084 B2 | 3/2008 | Abiko et al. | |
| 7,437,752 B2 * | 10/2008 | Heard et al. | 726/1 |
| 7,461,249 B1 | 12/2008 | Pearson et al. | |
| 7,475,420 B1 | 1/2009 | Hernacki | |
| 7,484,247 B2 | 1/2009 | Rozman et al. | |
| 7,490,355 B2 | 2/2009 | Wong | |
| 7,506,155 B1 | 3/2009 | Stewart et al. | |
| 7,519,984 B2 | 4/2009 | Bhogal et al. | |
| 7,523,484 B2 * | 4/2009 | Lum et al. | 726/1 |
| 7,526,654 B2 | 4/2009 | Charbonneau | |
| 7,539,857 B2 | 5/2009 | Bartlett et al. | |
| 7,559,080 B2 | 7/2009 | Bhargavan et al. | |
| 7,581,004 B2 | 8/2009 | Jakobson | |
| 7,630,986 B1 | 12/2009 | Herz et al. | |
| 7,653,811 B2 | 1/2010 | Yagiura | |
| 7,661,124 B2 | 2/2010 | Ramanathan et al. | |
| 7,689,563 B1 | 3/2010 | Jacobson | |
| 7,730,040 B2 | 6/2010 | Reasor et al. | |
| 7,742,406 B1 | 6/2010 | Muppala | |
| 7,847,694 B2 | 12/2010 | Lee et al. | |
| 7,877,616 B2 | 1/2011 | Abiko et al. | |
| 7,890,587 B1 | 2/2011 | Chebiyyam | |
| 7,940,756 B1 | 5/2011 | Duffy et al. | |
| 8,103,727 B2 | 1/2012 | Lin | |
| 8,111,413 B2 | 2/2012 | Nuggehalli et al. | |
| 8,151,363 B2 | 4/2012 | Smithson | |
| 8,181,036 B1 * | 5/2012 | Nachenberg | 713/189 |
| 8,199,965 B1 * | 6/2012 | Basavapatna et al. | 382/100 |
| 8,272,058 B2 | 9/2012 | Brennan | |
| 8,353,053 B1 | 1/2013 | Chebiyyam | |
| 8,446,607 B2 * | 5/2013 | Zucker et al. | 358/1.14 |
| 2001/0046069 A1 | 11/2001 | Jones | |
| 2002/0046275 A1 | 4/2002 | Crosbie et al. | |
| 2002/0083003 A1 | 6/2002 | Halliday et al. | |
| 2002/0099944 A1 | 7/2002 | Bowlin | |
| 2002/0157089 A1 | 10/2002 | Patel et al. | |
| 2003/0043036 A1 * | 3/2003 | Merrem et al. | 340/568.1 |
| 2003/0046679 A1 | 3/2003 | Singleton | |
| 2003/0065937 A1 * | 4/2003 | Watanabe et al. | 713/200 |
| 2003/0097583 A1 | 5/2003 | Lacan et al. | |
| 2003/0105979 A1 | 6/2003 | Itoh et al. | |
| 2003/0133443 A1 | 7/2003 | Klinker et al. | |
| 2003/0135744 A1 | 7/2003 | Almeida | |
| 2003/0177394 A1 | 9/2003 | Dozortsev | |
| 2003/0182435 A1 | 9/2003 | Redlich et al. | |
| 2003/0192033 A1 | 10/2003 | Gartside et al. | |
| 2003/0233421 A1 | 12/2003 | Shibata et al. | |
| 2004/0003255 A1 | 1/2004 | Apvrille et al. | |
| 2004/0006715 A1 | 1/2004 | Skrepetos | |
| 2004/0010686 A1 | 1/2004 | Goh et al. | |
| 2004/0027601 A1 | 2/2004 | Ito et al. | |
| 2004/0034794 A1 | 2/2004 | Mayer et al. | |
| 2004/0054928 A1 | 3/2004 | Hall | |
| 2004/0064732 A1 | 4/2004 | Hall | |
| 2004/0088433 A1 | 5/2004 | Kaler et al. | |
| 2004/0111482 A1 | 6/2004 | Bourges-Waldegg et al. | |
| 2004/0117802 A1 | 6/2004 | Green | |
| 2004/0146006 A1 | 7/2004 | Jackson | |
| 2004/0172557 A1 | 9/2004 | Nakae et al. | |
| 2004/0199555 A1 | 10/2004 | Krachman | |
| 2004/0199566 A1 | 10/2004 | Carlson et al. | |
| 2004/0199596 A1 | 10/2004 | Nutkis | |
| 2004/0230572 A1 | 11/2004 | Omigui | |
| 2004/0255138 A1 | 12/2004 | Nakae | |
| 2005/0033810 A1 | 2/2005 | Malcolm | |
| 2005/0038853 A1 | 2/2005 | Blanc et al. | |
| 2005/0044359 A1 | 2/2005 | Eriksson et al. | |
| 2005/0060643 A1 | 3/2005 | Glass et al. | |
| 2005/0131990 A1 | 6/2005 | Jewell | |
| 2005/0132184 A1 | 6/2005 | Palliyil et al. | |
| 2005/0154885 A1 * | 7/2005 | Viscomi et al. | 713/165 |
| 2005/0166066 A1 * | 7/2005 | Ahuja et al. | 713/189 |
| 2005/0172140 A1 * | 8/2005 | Ide | 713/190 |
| 2005/0198285 A1 | 9/2005 | Petit | |
| 2005/0216749 A1 | 9/2005 | Brent | |
| 2005/0262208 A1 | 11/2005 | Haviv et al. | |
| 2005/0275861 A1 | 12/2005 | Ferlitsch | |
| 2005/0289181 A1 | 12/2005 | Deninger et al. | |
| 2006/0005244 A1 | 1/2006 | Garbow et al. | |
| 2006/0010150 A1 * | 1/2006 | Shaath et al. | 707/102 |
| 2006/0010209 A1 | 1/2006 | Hodgson | |
| 2006/0010217 A1 | 1/2006 | Sood | |
| 2006/0021043 A1 | 1/2006 | Kaneko et al. | |
| 2006/0026593 A1 | 2/2006 | Canning et al. | |
| 2006/0039554 A1 * | 2/2006 | Fry | 380/29 |
| 2006/0041930 A1 | 2/2006 | Hafeman et al. | |
| 2006/0050879 A1 | 3/2006 | Iizuka | |
| 2006/0059548 A1 | 3/2006 | Hildre et al. | |
| 2006/0070089 A1 | 3/2006 | Shoaib et al. | |
| 2006/0075040 A1 | 4/2006 | Chimaytelli | |
| 2006/0075502 A1 | 4/2006 | Edwards | |
| 2006/0112166 A1 | 5/2006 | Pettigrew et al. | |
| 2006/0120526 A1 | 6/2006 | Boucher et al. | |
| 2006/0123413 A1 | 6/2006 | Collet et al. | |
| 2006/0123479 A1 | 6/2006 | Kumar et al. | |
| 2006/0132824 A1 | 6/2006 | Aritomi | |
| 2006/0168026 A1 | 7/2006 | Keohane et al. | |
| 2006/0190986 A1 | 8/2006 | Mont | |
| 2006/0224589 A1 | 10/2006 | Rowney et al. | |
| 2006/0248252 A1 | 11/2006 | Kharwa | |
| 2007/0022285 A1 * | 1/2007 | Groth et al. | 713/155 |
| 2007/0028112 A1 * | 2/2007 | Mackelden et al. | 713/176 |
| 2007/0033283 A1 | 2/2007 | Brown | |
| 2007/0064883 A1 | 3/2007 | Rosenthal et al. | |
| 2007/0074292 A1 | 3/2007 | Mimatsu | |
| 2007/0094394 A1 | 4/2007 | Singh et al. | |
| 2007/0101419 A1 | 5/2007 | Dawson | |
| 2007/0110089 A1 | 5/2007 | Essafi et al. | |
| 2007/0118904 A1 | 5/2007 | Goodman et al. | |
| 2007/0136593 A1 * | 6/2007 | Plavcan et al. | 713/172 |
| 2007/0143472 A1 | 6/2007 | Clark et al. | |
| 2007/0143851 A1 | 6/2007 | Nicodemus et al. | |
| 2007/0174909 A1 * | 7/2007 | Burchett et al. | 726/18 |
| 2007/0198656 A1 | 8/2007 | Mazzaferri et al. | |
| 2007/0214220 A1 | 9/2007 | Alsop et al. | |
| 2007/0220319 A1 | 9/2007 | Desai et al. | |
| 2007/0245148 A1 | 10/2007 | Buer | |
| 2007/0256142 A1 * | 11/2007 | Hartung et al. | 726/28 |
| 2007/0279668 A1 | 12/2007 | Czyszczewski et al. | |
| 2007/0280112 A1 | 12/2007 | Zheng et al. | |
| 2008/0034224 A1 * | 2/2008 | Ferren et al. | 713/193 |
| 2008/0040358 A1 * | 2/2008 | Deng | 707/100 |
| 2008/0065882 A1 * | 3/2008 | Goodman et al. | 713/165 |
| 2008/0065903 A1 * | 3/2008 | Goodman et al. | 713/193 |
| 2008/0079730 A1 | 4/2008 | Zhang et al. | |
| 2008/0083037 A1 * | 4/2008 | Kruse et al. | 726/27 |
| 2008/0120689 A1 | 5/2008 | Morris et al. | |
| 2008/0170785 A1 | 7/2008 | Simmons et al. | |
| 2008/0208988 A1 | 8/2008 | Khouri et al. | |
| 2008/0229428 A1 * | 9/2008 | Camiel | 726/27 |
| 2008/0279381 A1 | 11/2008 | Narendra et al. | |
| 2008/0309967 A1 | 12/2008 | Ferlitsch et al. | |
| 2009/0055536 A1 | 2/2009 | Jo | |
| 2009/0086252 A1 * | 4/2009 | Zucker et al. | 358/1.14 |
| 2009/0172786 A1 * | 7/2009 | Backa | 726/4 |
| 2009/0182931 A1 * | 7/2009 | Gill et al. | 711/103 |
| 2009/0327743 A1 * | 12/2009 | Finlayson et al. | 713/186 |
| 2010/0174784 A1 | 7/2010 | Levey et al. | |
| 2011/0167265 A1 | 7/2011 | Ahuja et al. | |
| 2011/0273554 A1 | 11/2011 | Su et al. | |

(56) References Cited

U.S. PATENT DOCUMENTS

2012/0011189 A1   1/2012  Werner et al.
2012/0183174 A1   7/2012  Basavapatna et al.
2012/0191792 A1   7/2012  Chebiyyam

OTHER PUBLICATIONS

Faith M. Heikkila, Encryption: Security Considerations for Portable Media Devices, pp. 22-27, IEEE Computer Society, 2007.*
Masaru Takesue, A scheme for protecting the information leakage via portable devices, IEEE, 2007.*
Hangbae Chang et al, Design of inside information leakage prevention system in ubiquitous computing environment, Springer-Verlag, 2005.*
Faith M. Heikkila, Encryption: security considerations for portable media devices, IEEE Computer Society, 2007.*
Robin Layland, Data leak prevention: coming soon to a business near you, Business Communication Review, 2007.*
Mingdi Xu et al, A new data protecting scheme based on TPM, IEEE, 2007.*
Peter Hannay et al, Pocket SDV with SD Guardian: A Secure & Forensically Safe Portable Execution Environment, Australian Digital Forensics Conference, 2007.*
Fumera, G. et al., "Spam Filtering Based on the Analysis of Text Information Embedded into Images," Journal of Machine Learning Research, Dec. 2006.
ClearContext, www.clearcontext.com/user_guide/; [available online at URL <http://web.archive.org/20061107135010/http://www.clearcontext.com/user_guide/>], Nov. 7, 206 (pp. 1-24).
Dabbish, et al., "Understanding Email Use: Predicting Action on a Message," [available online at URL: <http://www.cs.cmu.edu/~kraut/Rkraut.site.files/articles/dabbish05-UnderstandingEmailUse.pdf>], Apr. 2005 (pp. 1-10).
U.S. Appl. No. 11/349,479, filed Feb. 6, 2006.
Non-Final Rejection in U.S. Appl. No. 11/349,479 mailed on Dec. 8, 2008.
Response to Non-Final Action dated Dec. 8, 2008 in U.S. Appl. No. 11/349,479, filed Mar. 9, 2009.
Final Rejection in U.S. Appl. No. 11/349,479 mailed on Jun. 10, 2009.
Notice of Appeal in U.S. Appl. No. 11/349,479, filed Dec. 10, 2009.
Appeal Brief filed in U.S. Appl. No. 11/349,479, filed Dec. 10, 2009.
Examiner Interview Summary in U.S. Appl. No. 11/349,479 mailed on Feb. 5, 2010.
Non-Final Rejection in U.S. Appl. No. 11/349,479 mailed on Mar. 22, 2010.
Response to Non-Final Action dated Mar. 22, 2010 in U.S. Appl. No. 11/349,479, filed Jul. 22, 2010.
Notice of Allowance in U.S. Appl. No. 11/349,479 mailed on Nov. 8, 2010.
U.S. Appl. No. 11/473,930, filed Jun. 23, 2006.
Non-Final Office Action in U.S. Appl. No. 11/473,930 mailed on Aug. 17, 2009.
Response to Non-Final Office Action dated Aug. 17, 2009 in U.S. Appl. No. 11/473,930, filed Nov. 17, 2009.
Non-Final Office Action in U.S. Appl. No. 11/473,930 mailed on Jan. 26, 2010.
Response to Non-Final Office Action dated Jan. 26, 2010 in U.S. Appl. No. 11/473,930, filed Apr. 26, 2010.
Non-Final Office Action in U.S. Appl. No. 11/473,930 mailed on Jul. 16, 2010.
Response to Non-Final Office Action dated Jul. 16, 2010 in U.S. Appl. No. 11/473,930, filed Dec. 16, 2010.
Non-Final Office Action in U.S. Appl. No. 11/473,930 mailed on Mar. 10, 2011.
Response to Non-Final Action dated Mar. 10, 2011 in U.S. Appl. No. 11/473,930, filed Jun. 10, 2011.
U.S. Appl. No. 11/546,745, filed Nov. 29, 2006.
Non-Final Office Action in U.S. Appl. No. 11/546,745 mailed Nov. 2, 2009.
Response to Non-Final Office Action mailed on Nov. 2, 2009 U.S. Appl. No. 11/546,745, filed Feb. 2, 2010.
Non-Final Office Action in U.S. Appl. No. 11/546,745 mailed on Apr. 21, 2010.
Response to Non-Final Office Action mailed on Apr. 21, 2010 in U.S. Appl. No. 11/546,745, filed Jul. 21, 2010.
Final Office Action in U.S. Appl. No. 11/546,745 mailed on Oct. 21, 2010.
Request for Continued Examination and Amendment in U.S. Appl. No. 11/546,745, filed Feb. 22, 2011.
U.S. Appl. No. 11/740,844, filed Apr. 26, 2007.
Non-Final Office Action in U.S. Appl. No. 11/740,844 mailed on May 14, 2009.
Response to Non-Final Office Action dated May 14, 2009 in U.S. Appl. No. 11/740,844, filed Oct. 14, 2009.
Final Office Action in U.S. Appl. No. 11/740,844 mailed on Jan. 11, 2010.
Response to Final Office Action dated Jan. 11, 2010 in U.S. Appl. No. 11/740,844, filed Mar. 11, 2010.
Advisory Action in U.S. Appl. No. 11/740,844 mailed on Mar. 25, 2010.
Request for Continued Examination and Amendment filed in U.S. Appl. No. 11/740,844, filed Mar. 29, 2010.
Non-Final Office Action in U.S. Appl. No. 11/740,844 mailed on Jun. 24, 2010.
Response to Non-Final Office Action dated Jun. 24, 2010 in U.S. Appl. No. 11/740,844, filed Nov. 24, 2010.
Final Office Action in U.S. Appl. No. 11/740,844 mailed on Feb. 18, 2011.
Response to Final Office Action dated Feb. 18, 2011 in U.S. Appl. No. 11/740,844, filed Apr. 18, 2011.
Advisory Action in U.S. Appl. No. 11/740,844 mailed on Apr. 27, 2011.
Request for Continued Examination and Amendment filed in U.S. Appl. No. 11/740,844, filed May 18, 2011.
Non-Final Office Action in U.S. Appl. No. 11/740,844 mailed on Jul. 20, 2011.
U.S. Appl. No. 11/840,831, filed Aug. 17, 2007.
Non-Final Office Action in U.S. Appl. No. 11/840,831 mailed on Oct. 12, 2010.
Response to Non-Final Action dated Oct. 12, 2010 in U.S. Appl. No. 11/840,831, filed Feb. 14, 2011.
Final Office Action in U.S. Appl. No. 11/840,831 mailed on May 5, 2011.
Request for Continued Examination and Amendment in U.S. Appl. No. 11/840,831, filed Jul. 5, 2011.
Non-Final Office Action in U.S. Appl. No. 11/840,831 mailed on Jul. 21, 2011.
Non-Final Office Action in U.S. Appl. No. 12/187,207 mailed on Mar. 25, 2011.
Response to Non-Final Action dated Mar. 25, 2011 in U.S. Appl. No. 12/187,207, filed Jun. 27, 2011.
U.S. Appl. No. 11/850,432, filed Sep. 5, 2007.
U.S. Appl. No. 12/123,370, filed May 19, 2008.
U.S. Appl. No. 12/102,526, filed Apr. 14, 2008.
U.S. Appl. No. 11/210,321, filed Aug. 23, 2005.
Non-Final Office Action in U.S. Appl. No. 11/905,420 mailed on May 23, 2011.
Response to Non-Final Office Action dated Jan. 19, 2012 in U.S. Appl. No. 11/564,745, filed Apr. 16, 2012.
Request for Continued Examination and Amendment in U.S. Appl. No. 11/740,844, filed Apr. 16, 2012.
Notice of Allowance in U.S. Appl. No. 11/840,831 mailed on Apr. 3, 2012.
Request for Continued Examination in U.S. Appl. No. 11/840,831, filed Apr. 27, 2012.
Notice of Allowance in U.S. Appl. No. 11/840,831 mailed on May 9, 2012.
U.S. Appl. No. 13/434,777, filed Mar. 29, 2012, entitled "System, Method, and Computer Program Product for Determining Whether an Electronic Mail Message is Compliant with an Etiquette Policy", Inventor Gopi Krishna Chebiyyam.

(56) References Cited

OTHER PUBLICATIONS

Final Office Action in U.S. Appl. No. 11/473,930 mailed on Sep. 14, 2011.
Request for Continued Examination and Amendment in U.S. Appl. No. 11/473,930, filed Nov. 14, 2011.
Non-Final Office Action in U.S. Appl. No. 11/564,745 mailed on Jan. 19, 2012.
Response to Non-Final Office Action dated Jul. 20, 2011 in U.S. Appl. No. 11/740,844, filed Oct. 19, 2011.
Response to Non-Final Action dated Jul. 21, 2011 in U.S. Appl. No. 11/840,831, filed Oct. 19, 2011.
Final Office Action in U.S. Appl. No. 11/840,831 mailed on Dec. 21, 2011.
Response to Non-Final Action dated May 23, 2011 in U.S. Appl. No. 11/905,420, filed Aug. 22, 2011.
Final Office Action in U.S. Appl. No. 11/905,420 mailed on Nov. 2, 2011.
Request for Continued Examination and Amendment in U.S. Appl. No. 11/905,420, filed Jan. 3, 2012.
Notice of Allowance in U.S. Appl. No. 12/187,207 mailed on Aug. 24, 2011.
Request for Continued Examination in U.S. Appl. No. 12/187,207, filed Nov. 11, 2011.
Final Office Action in U.S. Appl. No. 11/740,844 mailed on Feb. 16, 2012.
Request for Continued Examination and Response in U.S. Appl. No. 11/840,831, filed Feb. 21, 2012.
Non-Final Office Action in U.S. Appl. No. 11/473,930 mailed on Mar. 1, 2012.
Notice of Allowance in U.S. Appl. No. 11/840,831 mailed on Mar. 16, 2012.
Request for Continued Examination in U.S. Appl. No. 11/840,831, filed Mar. 22, 2012.
U.S. Appl. No. 13/429,363 entitled "System, Method, and Computer Program Product for Preventing Image-Related Data Loss", filed Mar. 24, 2012.
Response to Non-Final Office Action dated Mar. 1, 2012 in U.S. Appl. No. 11/473,930, filed May 29, 2012.
Final Office Action in U.S. Appl. No. 11/473,930 mailed on Aug. 8, 2012.
Request for Continued Examination and Amendment to in U.S. Appl. No. 11/473,930, filed Nov. 7, 2012.
Final Office Action in U.S. Appl. No. 11/564,745 mailed on Jun. 4, 2012.
Request for Continued Examination and Amendment in U.S. Appl. No. 11/564,745, filed Aug. 6, 2012.
Non-Final Office Action in U.S. Appl. No. 11/740,844 mailed on May 10, 2012.
Response to Non-Final Office Action dated May 10, 2012 in U.S. Appl. No. 11/740,844, filed Jul. 10, 2012.
Non-Final Office Action in U.S. Appl. No. 11/905,420 mailed on Jul. 23, 2011.
Response to Non-Final Office Action dated Jul. 23, 2012 in U.S. Appl. No. 11/905,420, filed Oct. 23, 2012.
Notice of Allowance in U.S. Appl. No. 12/187,207 mailed on Sep. 11, 2012.
Non-Final Office Action in U.S. Appl. No. 13/434,777 mailed on Aug. 20, 2012.
Response to Non-Final Office Action dated Aug. 20, 2012 in U.S. Appl. No. 13/434,777, filed Nov. 20, 2012.
Non-Final Office Action in U.S. Appl. No. 11/473,930 mailed on Feb. 4, 2013.
Non-Final Office Action in U.S. Appl. No. 11/564,745 mailed on Apr. 5, 2013.
Final Office Action in U.S. Appl. No. 11/740,844 mailed on Aug. 15, 2012.
Request for Continued Examination and Amendment in U.S. Appl. No. 11/740,844, filed Nov. 15, 2012.
Non-Final Office Action in U.S. Appl. No. 11/740,844 mailed on May 3, 2013.
Notice of Allowance in U.S. Appl. No. 11/905,420 mailed on Dec. 6, 2012.
Request for Continued Examination in U.S. Appl. No. 12/187,207, filed Dec. 11, 2012.
Final Office Action in U.S. Appl. No. 13/434,777 mailed on Feb. 12, 2013.
Request for Continued Examination in U.S. Appl. No. 13/434,777, filed Apr. 15, 2013.
Non-Final Office Action in U.S. Appl. No. 13/434,777 mailed on May 23, 2013.
Final Office Action in U.S. Appl. No. 11/473,930 mailed on Jul. 16, 2013.
Notice of Allowance in U.S. Appl. No. 11/564,745 mailed on Jul. 29, 2013.
Notice of Allowance in U.S. Appl. No. 11/740,844 mailed Sep. 5, 2013.
Non-Final Office Action in U.S. Appl. No. 12/102,526 mailed on Nov. 24, 2010.
Final Office Action in U.S. Appl. No. 12/102,526 mailed on May 25, 2011.
Advisory Action in U.S. Appl. No. 12/102,526 mailed on Aug. 1, 2011.
Notice of Allowance in U.S. Appl. No. 12/102,526 mailed on Sep. 21, 2013.

* cited by examiner

Fig. 5

SECURING DATA USING INTEGRATED HOST-BASED DATA LOSS AGENT WITH ENCRYPTION DETECTION

BACKGROUND OF THE INVENTION

1. Field of the Invention

The present invention relates to a method and system for data loss prevention, securing data by integrating a host based data loss agent with file and full disk encryption software, as to facilitate the data loss agent with encryption detection abilities.

2. Description of the Related Art

Host-based data loss prevention (DLP) agents are used to prevent unauthorized user activities that result in data leaving the organization in a manner that compromises a set security policy. User activity is monitored within each host by an application software agent. The agent intercepts user activities via software probes that gather information about application requests and provide that information to the agent to determine if the user request should be allowed or blocked. Data loss incidents can be of many forms, such as file copy, email, web posting and printing of sensitive content.

Host-based DLP agents are used to manage devices by blocking removable media devices or setting them as read only according to device parameters and a security policy. A DLP agent may also allow a device to work, but detect and prevent data loss by analyzing the contents of files written to the removable device, and prevent only files containing sensitive data from being written. The same applies to other channels of data loss such as email, network connectivity, web, etc.

Often, it is required that sensitive data should leave the organization by one of the above methods. Information must be collaborated or shared with suppliers, buyers, or other parts of the organization which are not controlled by the same DLP system. A need exists to secure information even when it leaves the boundaries of the organization.

SUMMARY OF THE INVENTION

The present invention provides the capability to secure information even when it leaves the boundaries of the organization using a data loss agent integrated with a file and full disk encryption software.

The data loss agent will query the encryption software for encryption detection. The data loss agent may check if a connected device is currently encrypted, or if the encryption software policy forces encryption of any data written to the device. The data loss agent may also check if files that are about to be written to removable storage are encrypted. It may allow only such files to be written and block plain text files. The same mechanism may be provided for other data loss channels such as emails, instant messaging, etc.

A method for securing data in a computer system comprises detecting attempted connection or access to a data destination to which sensitive data may be written, determining an encryption status of the data destination, allowing the connection or access to the data destination when the data destination is encrypted, and taking action to secure the sensitive data when the data destination is not encrypted. The data destination may comprise a removable device and the encryption status is determined based on attributes of the removable device or data on the removable device. The encryption status may further be determined by examining blocks and/or sectors written on the device and comparing them by reading the data with the operating system's file reading interface to determine whether or not they are encrypted. The data destination may comprise a removable device and the encryption status is determined based on an encryption policy for the removable device. The data destination may comprise a removable device and the action taken comprises blocking access to the removable device or allowing restricted access to the removable device. Blocking access to the removable device may comprise indicating that connection of the device failed and allowing restricted access to the removable device comprises allowing read-only access to the device. The data destination may comprise a removable device, the attempted access may comprise attempting to write data to the removable device and the determination of the encryption status may comprise detecting that the data being written includes sensitive data and determining if the data being written is encrypted or if it will be encrypted during or after being written to the removable device. The action taken may comprise blocking writing of the data to the removable device. The attempted access may comprise attempting to send an email message having at least one attachment and the determination of the encryption status comprises determining if the at least one attachment is encrypted. The action taken may comprise blocking sending of the email message or encrypting at least one attachment before the email message is sent.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
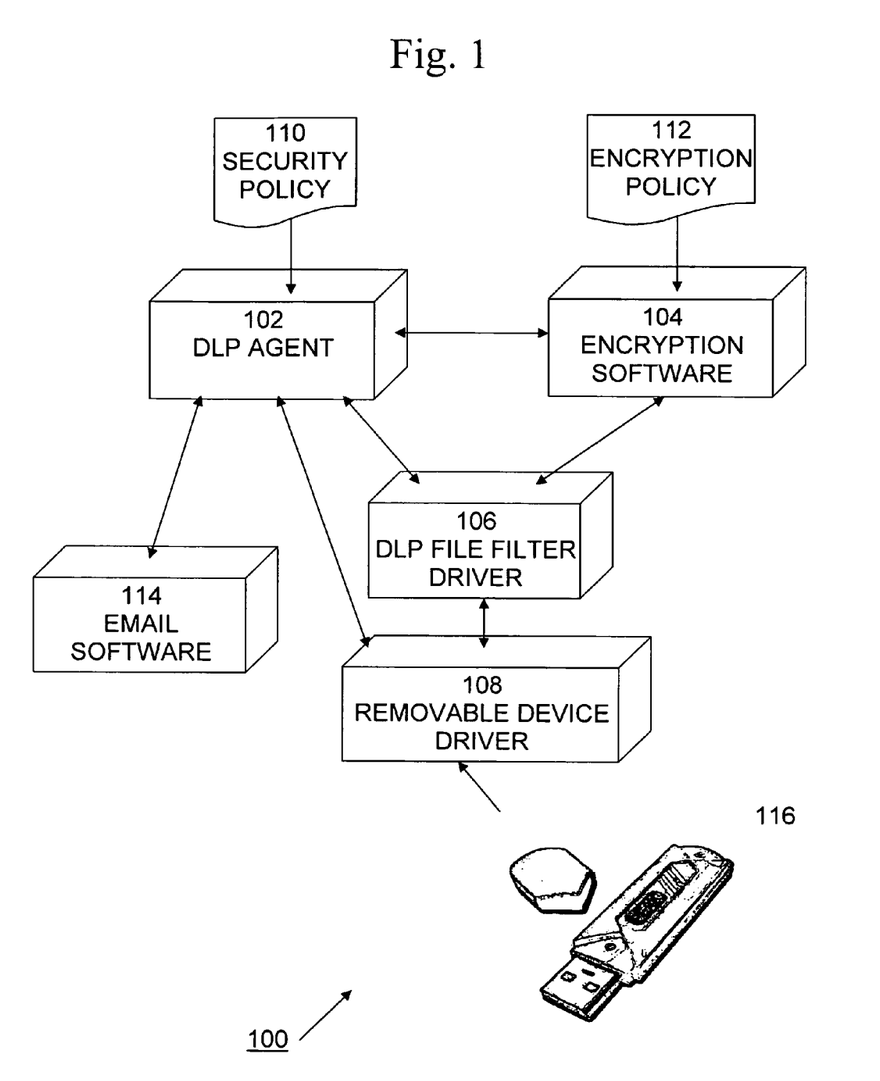
FIG. 1 is an exemplary block diagram of a software environment, such as in a host computer system, in which the present invention may be implemented.

The present invention provides a method and system for data loss prevention, and more particularly to a method of protecting sensitive data once the data is required to leave the boundaries of the organization by means of encryption. The system includes software agents on host machines that enforce a security policy and determine when files are copied to removable storage. The agents examine various criteria to determine if the file copy is allowed and if the contents of the copied files contains sensitive data FIG. 1 illustrates a software environment 100, such as in a host computer system, in which the present invention may be implemented. Software environment 100 includes Data Loss Prevention (DLP) agent 102, encryption software 104, file filter driver 106, removable device driver 108, security policy 110, encryption policy 112, and email software 114. Additional typical software components, such as application programs, are not shown, for simplicity. Removable device 116 is accessed by software environment 100, typically via removable device driver 108. Removable device 116 may be any device that can be connected to a host computer system and receive data from the host computer system. This received data may be stored on removable device 116 and/or it may be transmitted by removable device 116 to one or more other devices or systems. Examples of removable devices include, without limitation, flash drives, floppy disks, CDs, DVDs, hard disks, or wired adapters, such as USB adapters, IEEE1394, etc.

DLP agent 102 is software that is typically installed on all computers in an organization. DLP agent 102, in conjunction with DLP file filter driver 106, intercepts all requests to access removable device 116 and allows them to proceed only if they comply with security policy 110.

Security policy 110 is the definition of security for software environment 100, and may also define security for one or more systems, organizations or other entities associated with software environment 100. For an organization, security policy 110 addresses the constraints on behavior of its members as well as constraints imposed on adversaries by mechanisms such as doors, locks, keys and walls. For systems, security policy 110 addresses constraints on functions and flow among them, constraints on access by external systems and adversaries including programs and access to data by people.

File filter driver 106 is a driver that adds value to or modifies the behavior of another driver—specifically, the file system (not shown) of software environment 100. File filter driver 106 can filter I/O operations for one or more file systems or file system volumes. Depending on the nature of the driver, file filter driver 106 can log, observe, or modify file system events, or the filter can even prevent file system events from occurring.

Encryption software 104 controls, determines, and performs encryption of data in software environment 100, as specified by encryption policy 112. Encryption policy 112 specifies what data and/or types of data are to be encrypted based on a number of conditions, such as the location of the data, the locations and/or devices to which the data is to be written, etc. Encryption software 104 includes an encryption detection application program interface (API), which provides the capability for other software, such as DLP agent 102, to request and control encryption software 104 to perform inspection of data for encryption or lack of encryption.

By providing the encryption detection API from encryption software 104 to DLP agent 102, and using the file write blocking and email blocking capabilities of the DLP agent, DLP agent 102 has the ability to secure data with encryption detection in a number of situations. For example, DLP agent 102 provides the capability to detect the connection of a removable device 116 and to block access to the device, unless the device or the data on the device is encrypted in accordance with encryption policy 112. Likewise, DLP agent 102 provides the capability to block sensitive content from being written to removable device 116 unless the content is encrypted in accordance with encryption policy 112. Further, DLP agent 102 provides the capability to block email attachments to email messages being processed by email software 114, which include sensitive data that are not encrypted in accordance with encryption policy 112.

Figure 2:
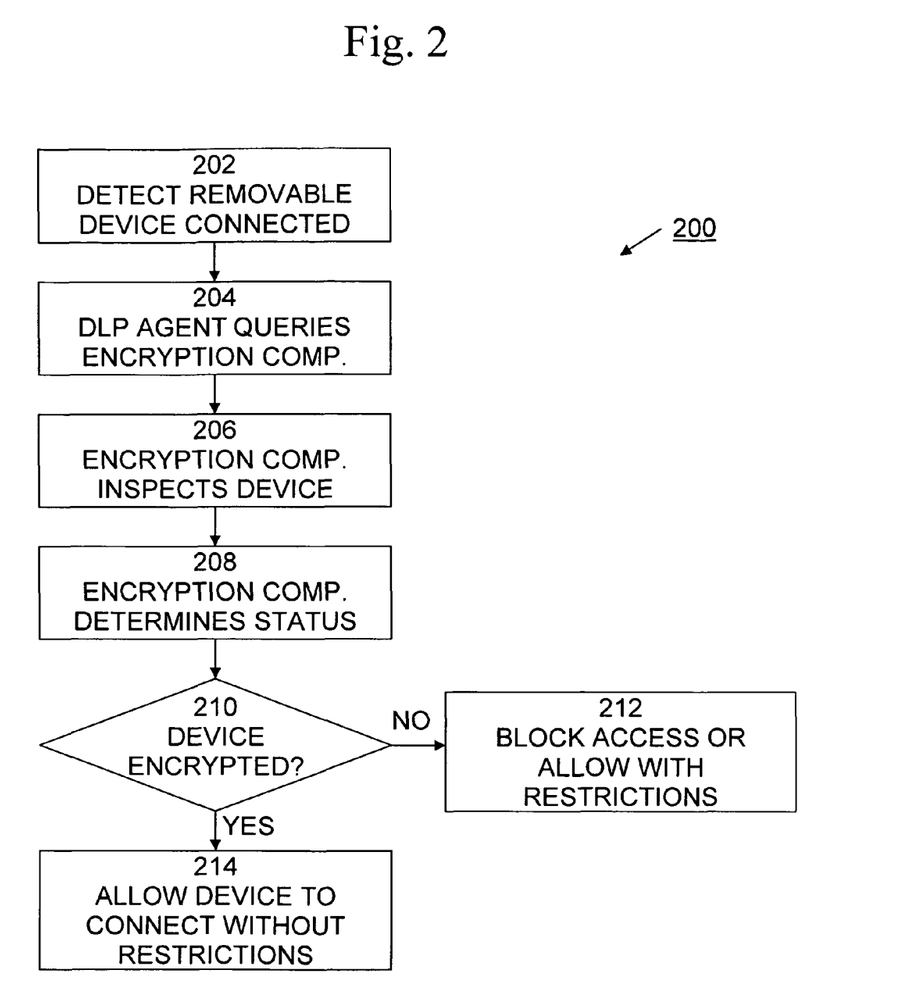
FIG. 2 is an exemplary flow diagram of a process of securing data on a removable device when such a device is connected to a host computer system.

A flow diagram of a process 200 of securing data on a removable device when such a device is connected to a host computer system is shown in FIG. 2. It is best viewed in conjunction with FIG. 1. Process 200 begins with step 202, in which DLP agent 102 detects that a removable device 116 has been connected to the host computer. In step 204, DLP agent 102 queries the encryption software component 104 to determine if the removable device 116 is safe. This includes passing device information relating to the removable device 116 to the encryption software. In step 206, the encryption software 104 inspects the removable device 116 and in step 208 determines whether or not the device is safe, i.e. properly encrypted. Encryption software 104 can determine that the device is encrypted based on attributes of the device or data on the device, such as attributes indicating encryption, or by examining blocks and/or sectors written on the device and comparing them with data read by the operating system file interface to determine whether or not they are encrypted. Alternatively, or in addition, encryption software 104 can determine that the device is encrypted by checking the encryption policy repository 112 to determine if the policy will force files written to the device to undergo encryption. If one of these is positive the encryption software will reply that the device is safe.

In step 210, DLP agent 102 determines how to proceed based on the encryption status returned by encryption software 104 in step 208. If removable device 116 is not safe, then process 200 proceeds to step 212, in which DLP agent 102 prevents sensitive data from being written to the removable device 116. Such prevention may be accomplished, for example, by blocking access to the removable device 116, such as by indicating to the host computer system that connection of the device failed, or by allowing restricted access in accordance with the DLP security policy 110, such as read-only access, to the device. If removable device 116 is safe, then process 200 proceeds to step 214, in which DLP agent 102 allows sensitive data to be written to removable device 116. In this case, the sensitive data written to removable device 116 will be encrypted by encryption software 104 in accordance with encryption policy 112.

Figure 3:
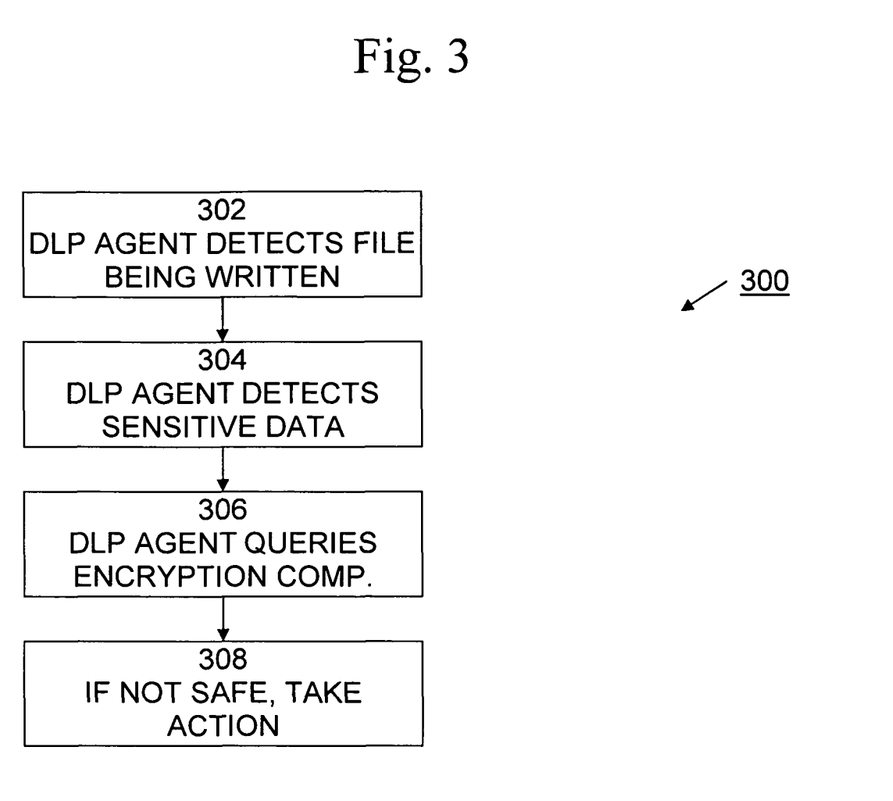
FIG. 3 is an exemplary flow diagram of a process of securing data on a removable device when data is to be written to the device.

A flow diagram of a process 300 of securing data on a removable device when data is to be written to the device is shown in FIG. 3. It is best viewed in conjunction with FIG. 1. Process 300 begins with step 302, in which DLP agent 102 identifies that a file is being written to a removable device 116. Typically, this is done by the DLP agent's file filter driver 106 detecting an attempt to write data to removable device 116. In step 304, DLP agent 102 further detects that the data being written includes sensitive data according to the DLP security 110 policy and the DLP agent's content detecting and tracking mechanism. In step 306, DLP agent 102 queries the encryption software 104 to determine if the file being written is encrypted or alternatively if it will be encrypted by the encryption software 104 during or after being written to removable device 116. The information provided by DLP agent 102 to encryption software 104 relating to the query may include information such as the logged in user, the files that are being written, and the destination (device and location) that the files are being written to. This information can be used by encryption software 104 to determine if the files are or will be encrypted. In step 308, if the encryption software 104 cannot guarantee that written data are or will be encrypted, the DLP agent 102 takes action to secure the data, such as blocking the file write request.

Figure 4:
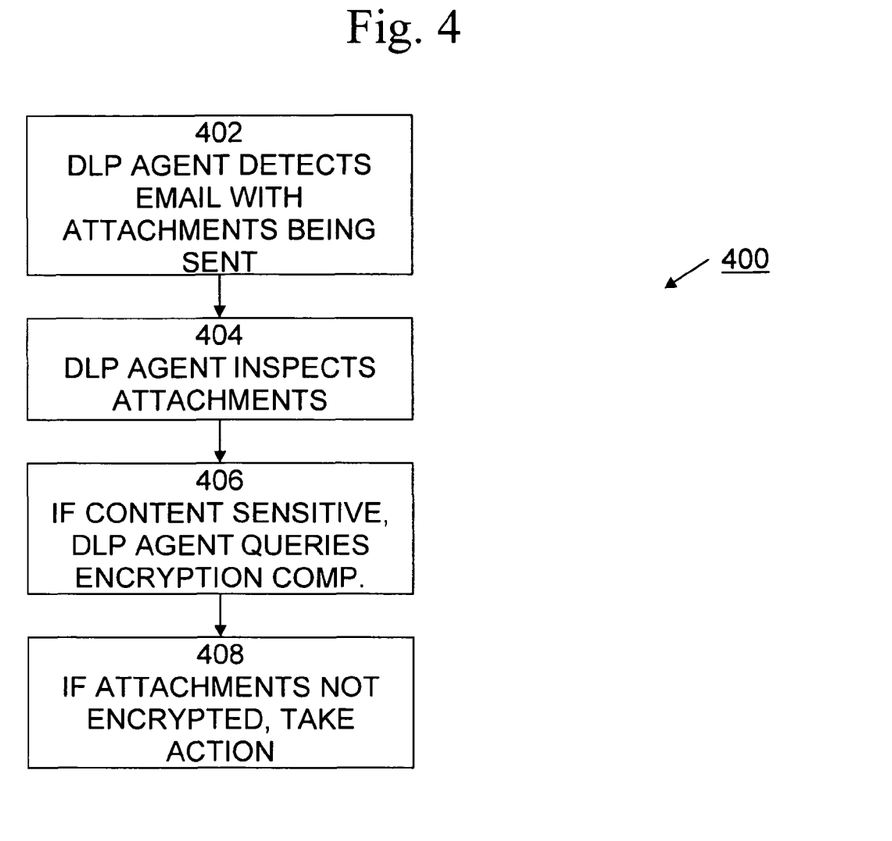
FIG. 4 is an exemplary flow diagram of process of securing data attached to email messages.

A flow diagram of a process 400 of securing data attached to email messages is shown in FIG. 4. It is best viewed in conjunction with FIG. 1. Process 400 begins with step 402, in which DLP agent 102 detects that an email containing attachments is being sent by email software. In step 404, DLP agent 102 inspects the contents or other attributes of the attachments as to determine if they contain sensitive data. In step 406, if the attachments are sensitive, DLP agent 102 queries encryption software 104 to determine if the attachments are encrypted. In step 408, if the attachments are not identified as encrypted, DLP agent 102 takes action to secure the sensitive data, such as by blocking the email software from sending the email.

Figure 5:
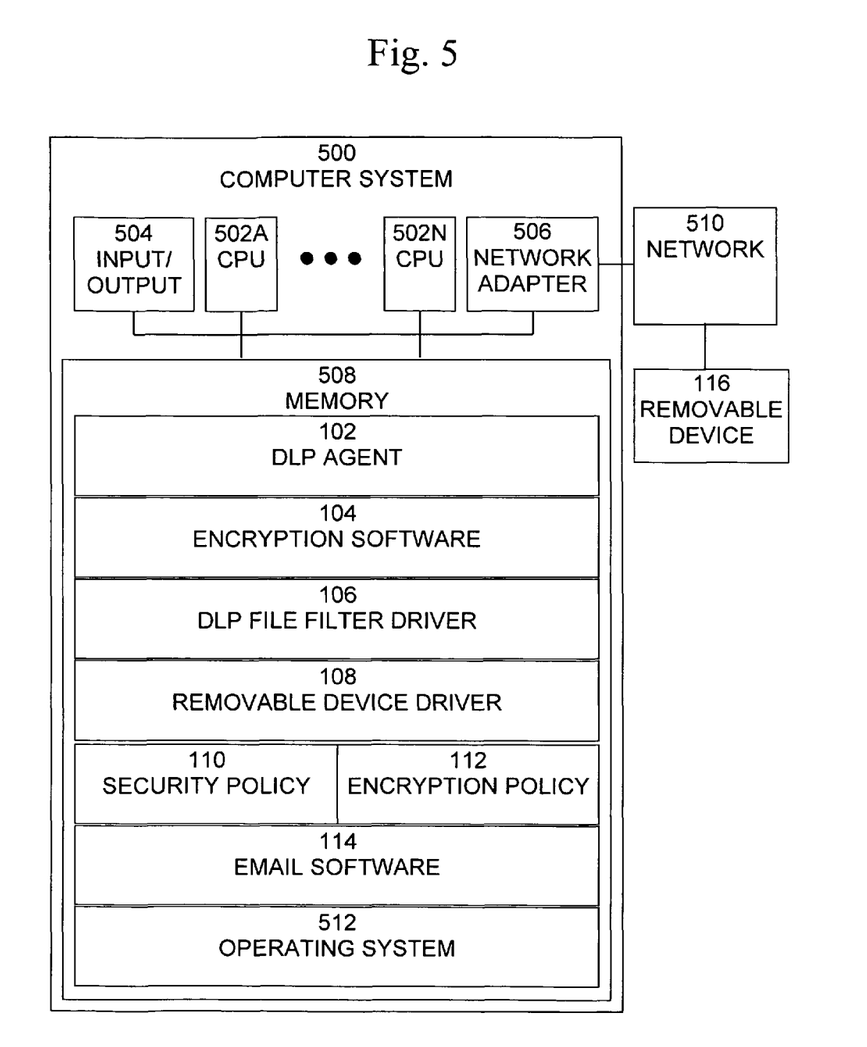
FIG. 5 is an exemplary block diagram of a computer system, in which the present invention may be implemented.

An exemplary block diagram of a computer system 500, in which the present invention may be implemented, is shown in FIG. 5. Computer system 500 is typically a programmed general-purpose computer system, such as a personal computer, workstation, server system, and minicomputer or mainframe computer. Computer system 500 includes one or more processors (CPUs) 502A-502N, input/output circuitry 540, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces computer system 500 with network 510. Network 510 may include one or more standard local area networks (LAN) or wide area networks (WAN), such as Ethernet, Token Ring, the Internet, or a private or proprietary LAN/WAN. Network 510 may further include networks that allow connection of removable devices 116. Such networks may include standard device connection interfaces, such as Universal Serial Bus (USB), IEEE 1394, External Serial Advanced Technology Attachment (eSATA), Compact Flash, Secure Digital, etc.

Memory 508 stores program instructions that are executed by, and data that are used and processed by, CPUs 502A-N to perform the functions of computer system 500. Memory 504 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 508 varies depending upon the function that computer system 500 is programmed to perform. In the example shown in FIG. 5, memory 508 includes Data Loss Prevention (DLP) agent 102, encryption software 104, file filter driver 106, removable device driver 108, security policy 110, encryption policy 112, and email software 114. Additional typical software components, such as application programs, are not shown, for simplicity. DLP agent 102, in conjunction with DLP file filter driver 106, intercepts all requests to access removable device 116 and allows them to proceed only if they comply with security policy 110.

Security policy 110 is the definition of security for computer system 500, and may also define security for one or more systems, organizations or other entities associated with computer system 500. File filter driver 106 is a driver that adds value to or modifies the behavior of another driver—specifically, the file system (included in operating system 512) of computer system 500. Encryption software 104 controls, determines, and performs encryption of data in software environment 100, as specified by encryption policy 112. Encryption policy 112 specifies what data and/or types of data are to be encrypted based on a number of conditions, such as the location of the data, the locations and/or devices to which the data is to be written, etc. Removable device driver 108 provides the capability to connect and access removable device 116. Operating system 512 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include storage media, examples of which include, but are not limited to, floppy disks, hard disk drives, CD-ROMs, DVD-ROMs, RAM, and, flash memory, as well as transmission media, examples of which include, but are not limited to, digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, comprising:
   detecting an attempted access to write content in a host computer system to a removable device;
   determining whether the content comprises data that is not encrypted;
   determining an encryption status of the removable device, based, at least in part, on examining whether blocks or sectors written on the removable device are encrypted or whether an encrypted portion of the content will be written to the removable device; and
   blocking the attempted access to the removable device, based, at least in part, on the encryption status, and in response to a determination that the content comprises the data that is not encrypted.

2. The method of claim 1, wherein the blocking comprises allowing a restricted access to the removable device.

3. The method of claim 2, wherein the blocking comprises indicating that a connection of the removable device failed, and the allowing the restricted access to the removable device comprises allowing a read-only access to the removable device.

4. The method of claim 1, wherein the attempted access comprises attempting to write the data to the removable device, and the determining the encryption status comprises determining if the data is encrypted or if the data will be encrypted during or after being written to the removable device.

5. The method of claim 4, wherein the blocking blocks a writing of the data to the removable device.

6. The method of claim 1, further comprising:
   comparing the content against a security policy, wherein the blocking blocks an attempted access to plain text data files.

7. The method of claim 1, further comprising:
   determining if an encryption policy on the host computer system will encrypt the content.

8. A computer system for handling data, comprising:
   a processor operable to execute computer program instructions; and
   a memory operable to store the computer program instructions, wherein the computer program instructions, when executed, cause the processor to
      detect an attempted access to write content to a removable device;
      determine whether the content comprises data that is not encrypted;
      determine an encryption status of the removable device, based, at least in part, on examining whether blocks or sectors written on the removable device are encrypted or whether an encrypted portion of the content will be written to the removable device; and
      block the attempted access to the removable device, based, at least in part, on the encryption status, and in response to a determination that the content comprises the data that is not encrypted.

9. The system of claim 8, wherein the computer program instructions cause the processor to block the attempted access by allowing a restricted access to the removable device.

10. The system of claim 9, wherein the computer program instructions cause the processor to block the attempted access by indicating that a connection of the removable device failed, and the computer program instructions cause the processor to allow the restricted access to the removable device by allowing a read-only access to the removable device.

11. The system of claim 8, wherein the attempted access comprises attempting to write the data to the removable device, and the encryption status is determined by determining if the data is encrypted or if the data will be encrypted during or after being written to the removable device.

12. The system of claim 11, wherein computer program instructions cause the processor to block the attempted access by blocking a writing of the data to the removable device.

13. A computer program product embodied in a non-transitory medium and, when executed by a processor, causes the processor to perform operations, comprising:
   detecting an attempted access to write content in a host computer system to a removable device;
   determining whether the content comprises data that is not encrypted;
   determining an encryption status of the removable device, based, at least in part, on examining whether blocks or sectors written on the removable device are encrypted or whether an encrypted portion of the content will be written to the removable device; and
   blocking the attempted access to the removable device, based, at least in part, on the encryption status, and in response to a determination that the content comprises the data that is not encrypted.

14. The computer program product of claim 13, wherein the blocking comprises allowing a restricted access to the removable device.

15. The computer program product of claim 14, wherein the blocking comprises indicating that a connection of the removable device failed, and the allowing the restricted access to the removable device comprises allowing a read-only access to the removable device.

16. The computer program product of claim 13, wherein the attempted access comprises attempting to write the data to the removable device, and the determining the encryption status comprises determining if the data is encrypted or if the data will be encrypted during or after being written to the removable device.

17. The computer program product of claim 16, wherein the blocking blocks a writing of the data to the removable device.

* * * * *

UNITED STATES PATENT AND TRADEMARK OFFICE
CERTIFICATE OF CORRECTION

PATENT NO. : 8,893,285 B2  Page 1 of 1
APPLICATION NO. : 12/076163
DATED : November 18, 2014
INVENTOR(S) : Elad Zucker et al.

It is certified that error appears in the above-identified patent and that said Letters Patent is hereby corrected as shown below:

On the title page, item (74), in column 2, in "Attorney, Agent or Firm", line 1, delete "Capitol" and insert -- Capital --, therefor.

Signed and Sealed this
Thirty-first Day of March, 2015

Michelle K. Lee
*Director of the United States Patent and Trademark Office*